March 22, 1932. P. SAPPINGTON 1,850,693
BRAKE
Filed Aug. 23, 1929 2 Sheets-Sheet 1
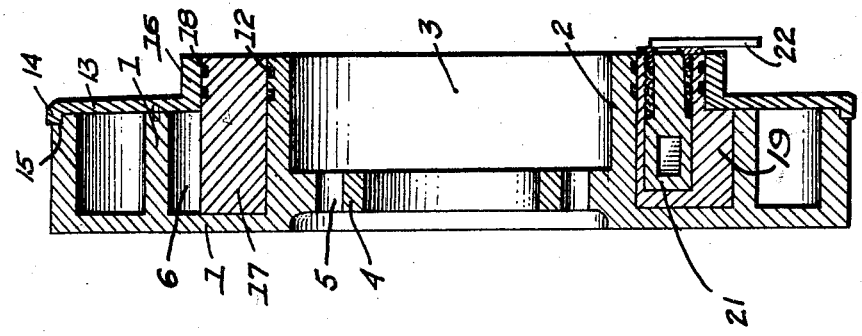
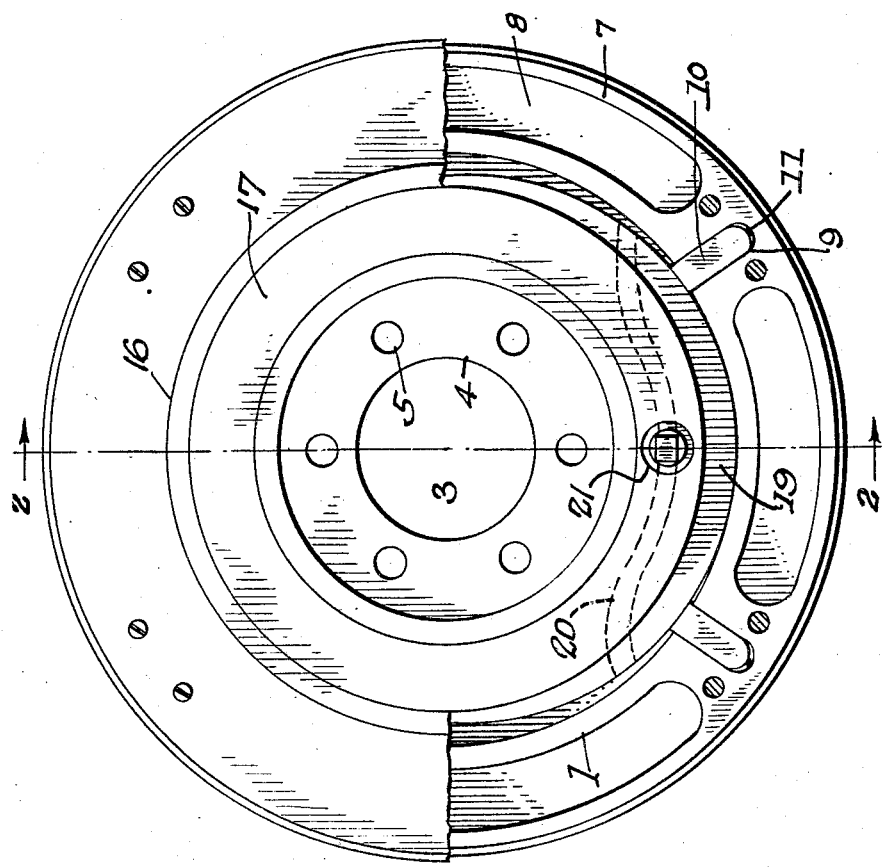
Paul Sappington, Inventor March 22, 1932.     P. SAPPINGTON     1,850,693
BRAKE
Filed Aug. 23, 1929     2 Sheets-Sheet 2

Paul Sappington Inventor
By C.A.Snow & Co.
Attorneys.

Patented Mar. 22, 1932

1,850,693

UNITED STATES PATENT OFFICE

PAUL SAPPINGTON, OF LOS ANGELES, CALIFORNIA

BRAKE

Application filed August 23, 1929. Serial No. 387,973.

This invention relates to brakes designed primarily for use in connection with motor vehicles although it is to be understood that the same can be employed in connection with any mechanism requiring the use of a brake.

It is an object of the invention to provide a brake made up of a stator and a rotor with an interposed compressible fluid having means under the control of an operator whereby the action of the fluid can be retarded or stopped at will to slow down or stop the rotating element.

Another object is to provide a structure of this character which is simple, compact and efficient and can be installed readily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the brake, a portion of the cover plate being removed.

Figure 2 is a section on line 2—2, Figure 1.

Figure 4:
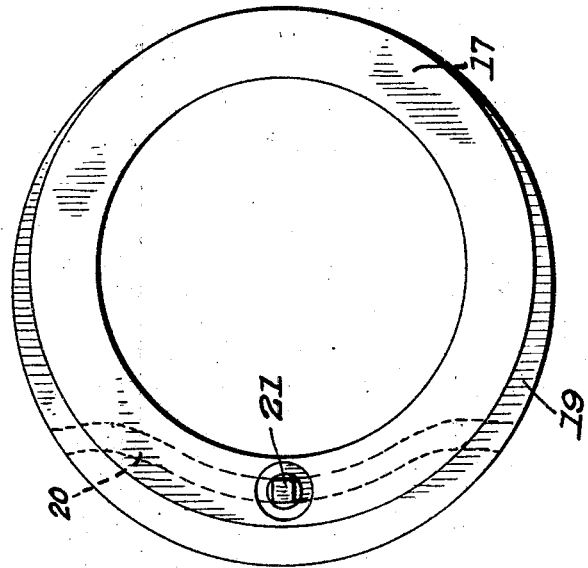
Figure 4 is an elevation of the stator.
Figure 3:
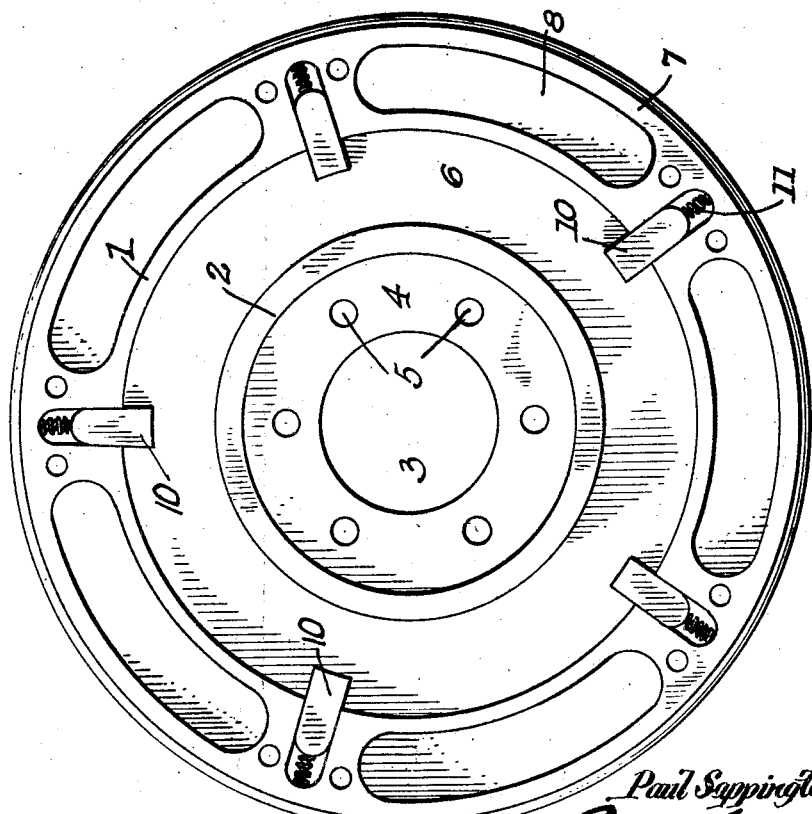
Figure 3 is an elevation of the rotor.

Referring to the figures by characters of reference, 1 designates a cylindrical rotor having a central or hub portion 2 formed with a recess 3 within which is provided an attaching flange 4 having openings 5 for the reception of bolts or other devices designed for securing the rotor to a wheel structure. The hub is surrounded by and forms the inner wall of a concentric compartment 6 spaced from the margin of the rotor by a relatively thick wall 7 which can be recessed or cut away at intervals as shown at 8 thereby to reduce the weight and cost of the structure. At regular intervals and between the recesses 8 are provided radial slots 9 in each of which is slidably mounted a head 10 the inner end of which is held normally projected in the chamber 6 by a spring 11.

The inner wall of the chamber 6 is of greater width than the outer wall as shown particularly in Figure 2 and that portion of the inner wall projecting outwardly beyond the outer wall is formed with annular grooves in which are seated expansible piston rings 12.

A cover plate 13 in the form of a ring is detachably secured on the outer wall of the cylindrical rotor 1 so as to close the recesses or cut away portions 8 and to lap the heads 10. At the outer edge of this cover plate there may be provided a rib 14 adapted to fit within a rabbet 15 in the outer or marginal portion of rotor 1. From the inner edge of the ring-like cover plate there is extended a flange 16. This flange is concentric with but spaced from the inner wall of the chamber 6.

Mounted within the chamber 6 is a stator 17 a portion of which is fitted snugly between the flange 16 of the cover plate and the inner wall of chamber 6. That portion of the stator surrounded by the flange 16 has annular grooves in which are seated expansible piston rings 18 adapted to bear against the inner surface of the flange 16.

A crescent-shaped cam 19 is formed on the periphery of the stator and extends almost entirely therearound, the outer surface of this cam merging into the outer surface of the stator at points almost diametrically opposite that point where the cam extends radially the greatest distance from the periphery of the rotor.

The stator and its cam portion are of course preferably formed in one piece and extending within the stator is a by-pass 20 opening through the marginal surface of the cam at opposite sides of the thickest portion of the cam. This by-pass has a controlling valve 21 extending into the stator from one face thereof and adapted to be actuated by any suitable means which may include a lever 22 shown in Figure 2.

In practice the stator and rotor are assembled and the space between them is filled with oil or any other suitable liquid which will also fill the by-pass 20. The rotor 1 is attached to the wheel of a vehicle while the stator 17 is fixedly mounted in any suitable manner, as by means of bolts entering it from the fixed structure, not shown. As long as the valve 21 is open the fluid will flow freely through the by-pass from one side to the other of the point of contact between the rotor and the stator. However, by shifting the valve so as to partly cut off the flow through the by-pass the action of the fluid will be retarded and as the heads 10 of the stator are constantly pressed against the surface of the stator it will be obvious that the action of the rotor will be correspondingly retarded when the flow of fluid to the by-pass is retarded.

By completely closing the by-pass 20 the rotor can be brought to a stop because it will not be possible for the fluid to move out of the path of the piston heads.

This structure is very compact and efficient, can be installed readily, and the several parts are readily accessible for the purpose of repairing or cleaning them.

What is claimed is:

A brake including a rotor having an annular chamber for holding a fluid, the inner wall of the chamber being of greater width than the outer wall thereof, spring-pressed radial pistons slidably mounted in the outer wall of said chamber, a stator within said chamber and concentric with the rotor, a cam portion on the periphery of the stator for contact with the outer wall of said chamber, and for engagement by the heads in the rotor, a ring-like cover plate secured to the rotor and surrounding a portion of the stator, sealing means carried by the stator and the rotor for cooperation with the cover plate and the stator respectively, a by-pass in the stator for fluid, said by-pass opening into the chamber in the rotor at opposite sides of the point of contact between the rotor and stator, and means for controlling the flow of fluid through the by-pass.

In testimony that I claim the foregoing as my own, I have hereto affixed my signature.

PAUL SAPPINGTON.